United States Patent [19]

Lin

[11] Patent Number: 4,837,968

[45] Date of Patent: Jun. 13, 1989

[54] SELF DETACHABLE SINKER ASSEMBLY FOR FISHING

[76] Inventor: Kuo-Yang Lin, No. 601, Chung Chen Road, Tsao Tun Chen, Nan Tou Hsien, Taiwan

[21] Appl. No.: 263,071

[22] Filed: Oct. 27, 1988

[51] Int. Cl.⁴ ............................................. A01K 95/00
[52] U.S. Cl. ................................. 43/43.12; 43/43.14; 43/44.97
[58] Field of Search ................... 43/43.12, 43.14, 44.9, 43/44.97

[56] References Cited

U.S. PATENT DOCUMENTS

| | | | |
|---|---|---|---|
| 1,500,463 | 7/1924 | Mattern | 43/43.14 |
| 3,180,052 | 4/1965 | Malesko | 43/43.12 |
| 3,513,583 | 5/1970 | Leash et al. | 43/43.12 |
| 4,638,587 | 1/1987 | Koch | 43/43.12 |

Primary Examiner—Nicholas P. Godici
Assistant Examiner—William Scott Andes
Attorney, Agent, or Firm—Browdy and Neimark

[57] ABSTRACT

A self-detachable sinker assembly for fishing sport, permitting stuck sinkers, attached at one end of a fishing line, to be readily released from the underwater obstacles so that the fishing line can be saved without being cut or broken; and by easy replacement of new set of sinkers can be fishing person resume the fishing game again almost in no time, the sinker assembly includes an elongate buckle belt made of flexible material, and a sinker in oval shape with a longitudinal groove disposed across the central portion thereof on each surface so that the buckle belt can be engaged in the grooves as the belt is fixed peripherally around the oval-shaped sinker by a number of protruding buckle members disposed at one end of the belt and engaged in a number of corresponding buckle holes disposed at the opposite end thereof, permitting the joint of the two ends thereof in a loop form with the oval sinker wrapped therein; on the same surface and at the middle of the belt are provided a pair of L-shaped attachment hooks which can be engaged with a pair of attachment blocks of another belt disposed on the similar end as the buckle holes disposed with the holes placed therebetween so that the sinker assembly can be joined one by one by engaging the L-shaped hook members with the attachment blocks of next buckle belt; once the sinker gets stuck by underwater obstacles, by pulling the fishing line up, the force will make the buckled belt open and the sinker separate therefrom. The flexible belt will expand into a straight form, permitting the fishing line to set free with more ease from the underwater obstacles such as rocks or plants.

3 Claims, 2 Drawing Sheets

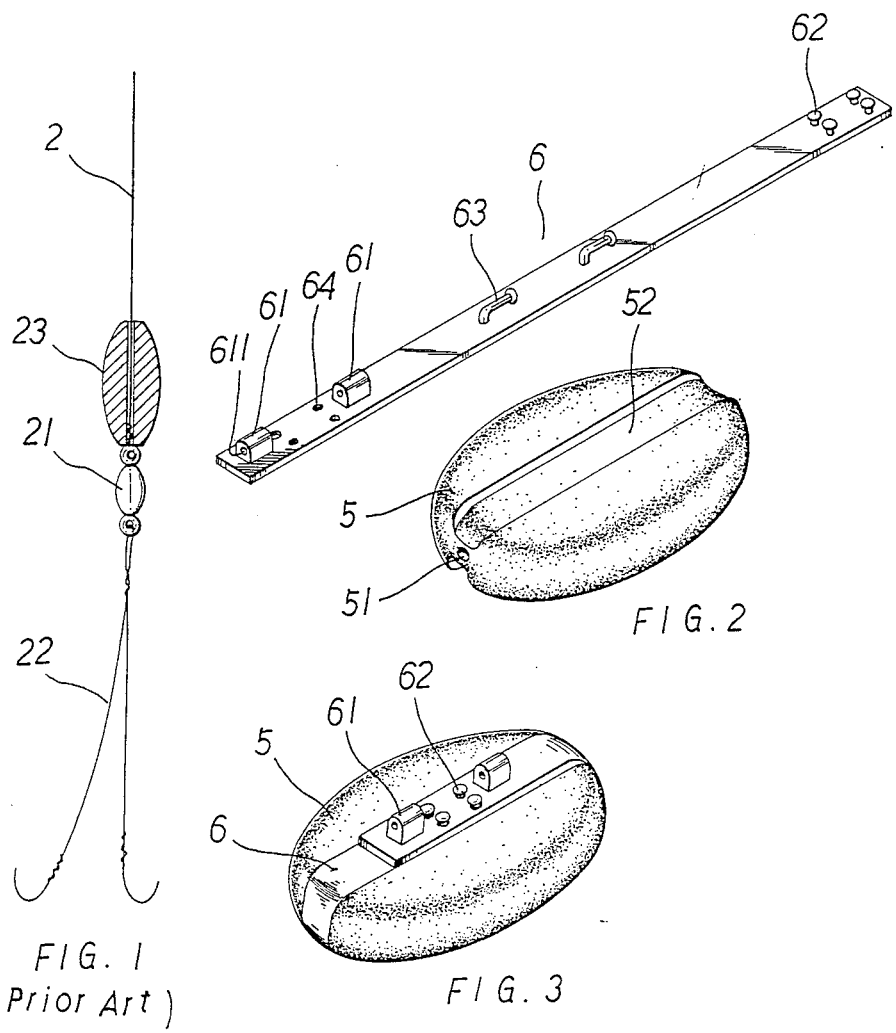

4,837,968

SELF DETACHABLE SINKER ASSEMBLY FOR FISHING

FIELD OF THE INVENTION

The present invention relates to a sinker assembly for use in fishing, and more particularly to a self-detachable sinker assembly which can be grouped together one by one in a cluster manner. Each sinker of the present invention is wrapped by a buckle belt which can be releasably tightened to hold the sinker in place. Once the sinker assembly of the present invention got stuck by underwater obstacles, such as rocks and plants, it is very easy to save the fishing lines as well as the fishing hooks only by letting go of the sinkers contained in the buckle belts one by one as long as the pull force on the fishing line is large enough to render the buckled belts open.

Fishing has been a worldwide popular outdoors sport. Various fishing tackles are adopted to meet different fishing requirements. Some people engage in their fishing along river banks, and some prefer to do it by the coastal area. Naturally, the fishing equipment are various according to the respective fishing conditions.

However, many fishing people no matter where they fish have often confronted themselves with the same problem wherein their fishing sinkers get stuck by underwater obstacles such as rocks or plants. To escape from these embarrassing situations, most people will exert force on the fishing lines, trying to pull the stuck sinkers out of the obstacles, thus resulting in the breaking of the fishing rods or loss of fishing hooks.

SUMMARY OF THE PRESENT INVENTION

Therefore, the primary object of the present invention is to provide a self detachable sinker assembly including a releasable buckle belt as well as a sinker which is wrapped by the flexible buckle belt in use so that the stuck fishing lines and hooks can be readily freed at the expense of the detachable sinkers.

One further object of the present invention is to provide a self detachable sinker assembly which can be which can be separably grouped together one by one in a cluster so that fishing people can constitute a combined sinker of different weight by means of a single type sinker.

A number of drawings are presented in company with a detailed description of the present invention, giving a more understandable illustration of the inventive subject, in which:

BRIEF DESCRIPTION OF THE DRAWINGS

FIG. 1 is a diagram showing a conventional arrangement of the sinker and fishing hooks and the connecting loop;

FIG. 2 is a diagram showing the exploded components of the present invention;

FIG. 3 is a diagram showing the practice of the present invention;

FIG. 4 is a diagram showing the bottom of the wrapped sinker of FIG. 3;

DETAILED DESCRIPTION OF THE PREFERRED EMBODIMENT

Figure 5:
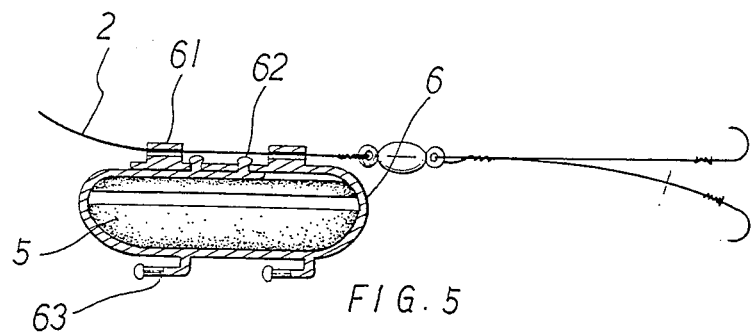
FIG. 5 is a diagram showing the present sinker assembly in association with a fishing line and a pair of fishing hooks.
Figure 6:
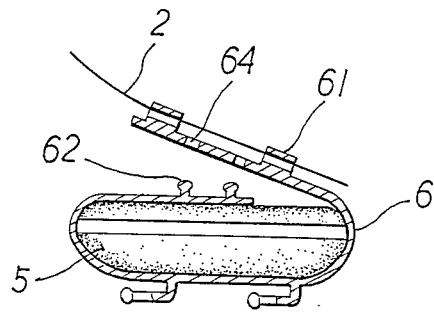
FIG. 6 is a diagram showing the buckled belt being released by external pull force on the fishing line.

As shown in FIG. 1, a conventional fishing line 2 is provided with at the end thereof a sinker 23 having a through hole right at the central portion thereof for the passage of the fishing line 2 and a connection loop 21 is located right under the sinker 23 with a pair of fishing hooks 22 coupled thereto.

Referring to FIG. 2, the self detachable sinker assembly of the present invention mainly comprises a flexible buckle belt 6 and a oval-shaped sinker 5 that are integrally put together as one unit. Moreover, the sinker assembly can be grouped together in consecutive order in a cluster manner.

The sinker 5 is provided with a longitudinal through hole 51 at the center thereof with a longitudinal groove 52 disposed at the middle of the top and bottom surfaces thereof respectively.

The flexible buckle belt 6 is produced in integral form and is able to be resiliently bent to wrap the sinker 5 within a loop formed by buckling the two ends of the buckle belt 6 together. On the right end of the buckle belt 6 are disposed four protruding buckle members 62 in operative engagement with a number of corresponding buckle holes 64 disposed at the opposite end of the buckle belt 6, in such a manner that the buckle belt 6 can be joined end to end to form a loop to accommodate the sinker 52 therein.

Figure 7:
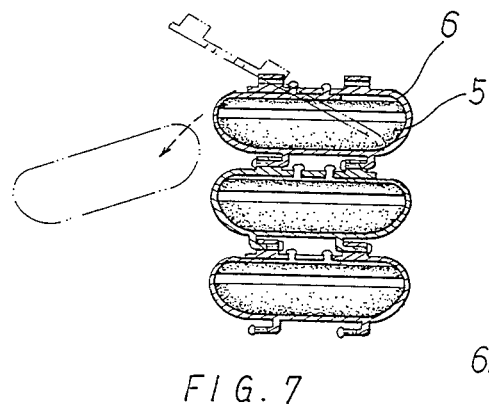
FIG. 7 is a diagram showing a number of sinkers grouped together by way of the present invention.

To group a number of sinkers 5 together in a cluster, the present buckle belt 6 is also provided with, on the same surface as the buckle members located, a pair of L-shaped attachment hooks 63 at the middle point thereof and a pair of spaced attachment blocks 61 with the buckle holes 64 disposed therebetween. Along the axial direction, each attachment block 61 is provided with a through hole 611 in which the L-shaped hook members 63 of another buckle belt 6 can be engaged to group the so fixed sinkers 5 together in a cluster as shown in FIG. 7.

Figure 8:
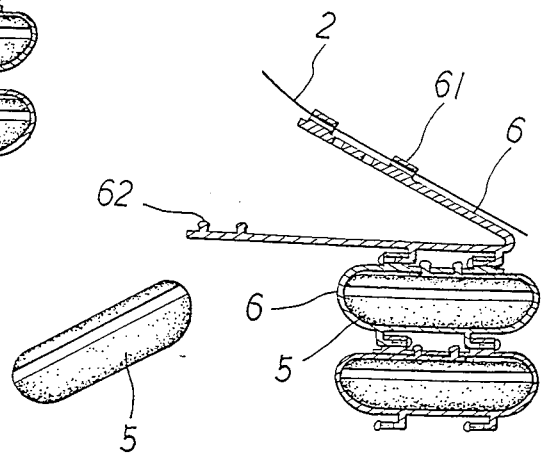
FIG. 8 is a diagram showing a buckled belt being opened and the sinker container therein dropped.

In assembly, the buckle belt 6 is engaged in the grooves 52 of the sinker 5 with the two ends thereof overlapped and buckled together by way of the buckle members 62 as well the corresponding buckle holes 64 so that the sinker 5 is tightly wrapped and fixed in place by the belt 6 as shown in FIGS. 3 and 4. Furthermore, to group a number of so fixed sinkers together, as shown in FIG. 7 and FIG. 8, the L-shaped hook members 63 disposed at the bottom surface of a buckled belt 6 are engaged with attachment blocks 61 of another buckle belt 6. Thereby a number of sinkers 5 can be readily grouped together as one desires.

As shown in FIG. 5 and FIG. 8, the fishing line 2 is led through the through holes 611 of the attachment blocks 61 of the buckle belt 6 in association with the topmost sinker of the cluster of sinkers, and the fishing hooks are then attached at the terminal of fishing line 2.

Referring to FIG. 2, the protruding buckle members 62 as well the L-shaped hook members 63 all terminate in bulged ends so that they can firmly engage in their respective holes 64 and 611 in assembly.

In practical use, the grouped sinkers 5 are in association with fishing hooks with the number thereof variable by proper attachment. Once the sinkers get stuck by rocks or underwater plants, the fishing person can pull the fishing line hard thereby the force will render the buckled belt 6 to open as shown in FIG. 8, permitting the wrapped sinkers 5 to get free one by one so that the stuck fishing line can be freed from the obstacles, such as rocks and underwater plants, without causing much damage to the fishing line and hooks.

What I claim is:

1. A self detachable sinker assembly comprising a flexible buckle belt and a sinker means wherein said buckle belt is of elongate form and can be properly bent into a loop to wrap said sinker means therein; on the first end of the top surface of said buckle belt are disposed a number of protruding buckle members being in buckle engagement with a number of corresponding buckle holes disposed on the second end of said buckle belt; a pair of attachment blocks are spacedly disposed on the second end of said buckle belt with said buckle holes located therebetween and each of said blocks is provided with a through hole near the top portion thereof; a pair of L-shaped hook members are spacedly disposed at the middle of said buckle belt in a manner to be in operative engagement with the through holes of attachment blocks of another consecutively placed sinker assembly so that a number of sinker assemblies can be grouped together in a cluster; said sinker means is provided with a longitudinal groove on the top and bottom surface thereof, the groove having approximately the same width as that of said buckle belt so that the buckle belt can be located therein in assembly; whereby the buckle belt can be joined end to end by means of said protruding buckle members as well as said buckle holes to constitute a loop to wrap said sinker means therein with said attachment blocks disposed on the top and said L-shaped hooks on the bottom of the looped buckle belt, permitting a number of sinker assemblies to be grouped together in consecutive order.

2. A self-detachable sinker assembly as claimed in claim 1 wherein each said protruding buckle member and each of said L-shaped hooks are provided with a bulged end portion thereby the engagement with respective said buckle hole and said attachment block can be secured.

3. A self-detachable sinker assembly as claimed in claim 2 wherein said L-shaped hooks are disposed with the ends not fixed on the buckle belt pointed toward said protruding buckle members disposed on the first end of said buckle belt.

* * * * *